(12) United States Patent
Kamel et al.

(10) Patent No.: US 7,065,576 B2
(45) Date of Patent: Jun. 20, 2006

(54) DYNAMIC MULTICAST GROUPING FOR VEHICLES AND OTHER MOBILE OBJECTS

(75) Inventors: Ibrahim Mostafa Kamel, Monmouth Junction, NJ (US); Li Zou, Atlanta, GA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 788 days.

(21) Appl. No.: 09/965,691

(22) Filed: Sep. 27, 2001

(65) Prior Publication Data

US 2003/0060216 A1   Mar. 27, 2003

(51) Int. Cl.
G06F 15/16 (2006.01)
G06F 15/173 (2006.01)

(52) U.S. Cl. .................. 709/227; 709/228; 709/223; 455/519

(58) Field of Classification Search ............... 709/205, 709/209, 227, 228, 223, 239; 455/519
See application file for complete search history.

(56) References Cited

U.S. PATENT DOCUMENTS

| | | | | |
|---|---|---|---|---|
| 5,457,680 | A * | 10/1995 | Kamm et al. ............... | 370/332 |
| 5,848,373 | A * | 12/1998 | DeLorme et al. ........... | 701/200 |
| 6,032,051 | A * | 2/2000 | Hall et al. .................. | 455/518 |
| 6,128,648 | A * | 10/2000 | Chen et al. ................. | 709/213 |
| 6,336,134 | B1 * | 1/2002 | Varma ........................ | 709/205 |
| 6,424,840 | B1 * | 7/2002 | Fitch et al. ............... | 455/456.1 |
| 6,477,149 | B1 * | 11/2002 | Okanoue ..................... | 370/312 |
| 6,574,633 | B1 * | 6/2003 | Jamalabad et al. .......... | 707/102 |
| 6,754,463 | B1 * | 6/2004 | Nishikino et al. .......... | 399/208 |
| 6,757,262 | B1 * | 6/2004 | Weisshaar et al. .......... | 370/310 |
| 6,757,433 | B1 * | 6/2004 | Lee ............................ | 382/236 |
| 6,847,633 | B1 * | 1/2005 | Ryu et al. ................... | 370/352 |
| 6,917,985 | B1 * | 7/2005 | Madruga et al. ............ | 709/238 |
| 2002/0026525 | A1 * | 2/2002 | Armitage .................... | 709/238 |
| 2002/0058495 | A1 * | 5/2002 | Chow et al. ................ | 455/406 |
| 2002/0156578 | A1 * | 10/2002 | Kondou et al. ............. | 701/213 |
| 2005/0213545 | A1 * | 9/2005 | Choyi et al. ................ | 370/338 |

FOREIGN PATENT DOCUMENTS

WO   WO 01 65885   9/2001

OTHER PUBLICATIONS

J. Habetha et al., "Outline of a Centralised Multihop ad hoc Wireles Network", Computer Networks, Elsevier Science Publishers B.V., Amsterdam, NL, vol. 37, No. 1, Sep. 2001, pp. 63-71.

(Continued)

*Primary Examiner*—Ario Etienne
*Assistant Examiner*—El Hadji M. Sall
(74) *Attorney, Agent, or Firm*—Harness, Dickey & Pierce, PLC

(57) ABSTRACT

An area is divided into regions or cells each having an associated multicast group address. The cells are organized using a quad-tree data structure that is dynamically updated. Mobile entities within a given cell elect one of their members as coordinator for assessing cost data associated with subdividing or merging the cell with other sibling cells. The coordinators communicate this cost data to a partitioning entity, which may be a central server, that computes a new partition scheme using a greedy algorithm. The new partition scheme is then broadcast to the mobile entities for use in subsequent communication. Mobile entities join multicast groups that intersect with their individual vision domains. In this way, mobile entities can acquire information from other mobile entities without the need to monitor all multicast group transmissions.

12 Claims, 7 Drawing Sheets

OTHER PUBLICATIONS

M.A. Dru and S. Saada, "Location-Based Mobile Services: the Essentials" Alcatel Telecommunications Review, Jan. 1, 2001, pp. 71-76.

Mario Gerla et al., "Tree Multicast Strategies inMonile, Multihop Wireless Networks" Mobile Networks and Applications, vol. 4, Oct. 1999, pp. 193-207.

* cited by examiner

DYNAMIC MULTICAST GROUPING FOR VEHICLES AND OTHER MOBILE OBJECTS

BACKGROUND AND SUMMARY OF THE INVENTION

The present invention relates generally to distributed information systems. More particularly, the invention relates to a scalable multicast algorithm for mobile agents. Applications for the invention include the intelligent transportation system where smart vehicles are connected to a network and periodically send state information, such as position, speed, traffic and weather conditions, and the like. The invention has further utility in the intelligent cooperative transportation system, in which vehicles cooperate to deliver merchandise to its destination. The principles of the invention can also be extended to other mobile object applications, including multi-user network games.

Distributed information systems are becoming increasingly popular as more and more devices establish connectivity on the internet. One major type of distributed information system involves clients that are only interested in information of its immediate geographical vicinity. The technique of the invention aims to efficiently discover and retrieve such information. One particularly promising application involves the intelligent transportation system. Once the majority of all vehicles are equipped with wireless internet connectivity capability, software applications running on the vehicular computer systems can be used to establish a distributed information system.

In such a system each vehicle would serve as both a data source and a data destination, gathering information about the location of each vehicle, its speed, direction of travel, and other state information such as traffic and weather conditions. In effect, each vehicle would gather information about its state and would broadcast that information to interested vehicles, which would make use of the information.

One common way to construct a distributed information system for this kind of application is to establish a central server which collects information from all users (e.g., all vehicles). When a user wants to get information about conditions in a particular region, the user sends a request to the server and the server then transmits the results back to the requesting user. This approach has scaling problems, as the number of users in the application increases, the network bandwidth and processing resources required by the central server increase rapidly. The central server soon becomes a bottleneck, and a single point of failure for the system.

Another common technique is to have all users join a common multicast group through which they broadcast all information. After receiving information from the multicast group, each user must filter out any messages that it considers superfluous. In the traffic application, for example, a user on the upper east side of the city might have no interest in traffic conditions on the lower west side and might therefore configure the client application software to filter out lower west side information as superfluous.

While the common multicast approach solves the single point of failure problem associated with a single server, it does so at a significant cost of increasing network bandwidth requirements and also increasing the processing resources consumed by each user's onboard computer.

The present invention addresses the problem by providing multiple multicast groups. The system divides an area into regions or cells and associates each region or cell with a multicast group address. In this way, users that are only interested in information in their immediately surrounding area, or vision domain, discover information of interest through cooperation with other nearby users. Thus a user on the upper west side would acquire information from other users in that region or cell, using the multicast group address associated with that cell. Meanwhile, information concerning conditions in the lower west side cell would be communicated using a different multicast group address. Thus the users on the upper east side would not need to filter out lower west side information. Of course, if a particular user is interested in obtaining information about another region or cell, the well-designed system should be prepared to deliver it. The present invention makes this possible by using a dynamically reconfigurable quad-tree data structure that stores the current configuration and relationship of all cells or regions. While the quad-tree data structure is presently preferred, other data structures such as K-d trees or the like may be used. The data structure is maintained and updated by a partitioning server, or servers, which can be a central server or distributed servers, that determines the optimal size and grouping of cells based on the ever-changing needs of the users.

As the vehicles for mobile objects move from place to place, the partitioning server acquires information about this movement and reconfigures the quad-tree data structure to optimize performance. Thus regions with a high-density of users will be broken into a larger number of cells by partitioning one or more existing cells into smaller ones. Conversely, regions that are sparsely populated may be assigned to larger cells by merging smaller contiguous cells that are less populated.

According to one aspect of the invention, the dynamic quad-tree partitioning algorithm assigns a coordinator for each cell that is elected by the users of that cell. The coordinator then assesses the cost associated with splitting or merging its cell based on local knowledge of usage conditions. By having one elected coordinator perform this function, the other users within the cell do not have to expend computational resources gathering this information. The coordinator sends the cost information to the partitioning server. The partitioning server uses an algorithm to determine which cells should be split and which cells should be merged to minimize the global cost, thereby optimizing the performance of the system. The partitioning server then broadcasts the new partition scheme to all users. In this way, the users are all advised of which cells are available to communicate with. Thus, if a user on the upper west side wishes to obtain information from the lower east side, that user can identify which cell is currently associated with the lower east side that may contain information of interest.

The invention thus provides a hybrid solution that uses both distributed components (multicasting, coordinator) and centralized components (partition server) to dynamically partition an area so that the mobile objects are grouped efficiently. For a more complete understanding of the invention, its objects and advantages, refer to the following description and to the accompanying drawings.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
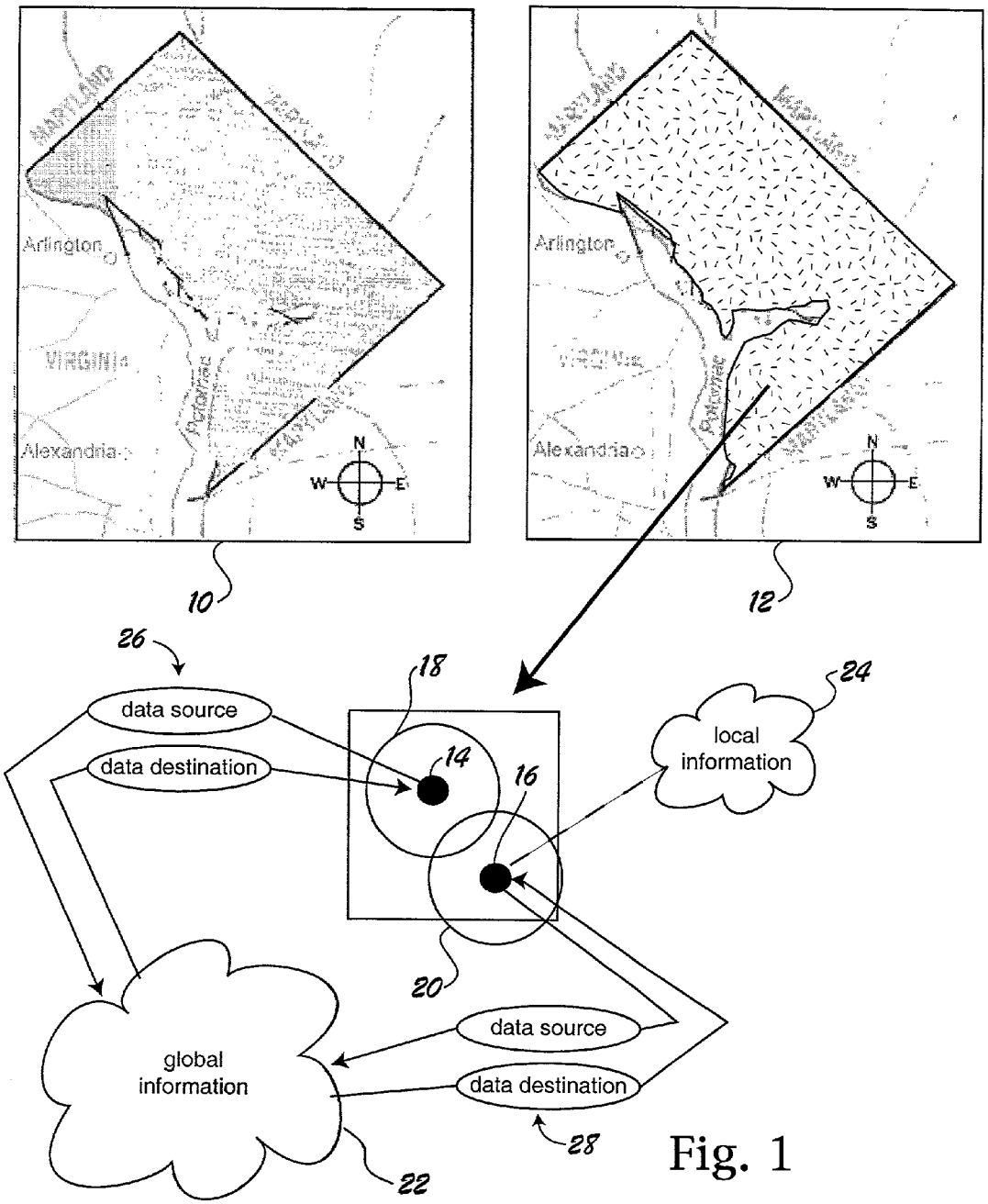
FIG. 1 is a diagrammatic representation of an exemplary geographic area that has been divided into regions or cells, useful in understanding the principles of the invention.

The dynamic multicast grouping algorithm of the present invention has many uses. To teach the principles of the invention, a distributed traffic condition discovery application is illustrated in FIG. 1. Mobile entities move about within a geographic area and communicate traffic conditions among one another by joining various multicast groups that are each associated with a region or cell within the geographic area. Although the mobile entities may be automotive vehicles, it should be apparent that the principles of the invention can readily be applied to other types of mobile entities, such as aircraft, pedestrians, and even packages or goods in transit. Furthermore, while the distributed traffic condition discovery application has been illustrated here, the invention is capable of a wide range of other uses. Another example of such a use is the intelligent cooperative transportation system, in which vehicles cooperate with other vehicles to deliver other merchandise to the proper destinations. The invention can also be used in multi-user network games and other simulations.

Referring to FIG. 1, a map of the District of Columbia is illustrated at 10. The map depicts an exemplary geographic area of interest which includes the District of Columbia and its surrounding areas in Virginia and Maryland. Shown at 12 is a copy of the same District of Columbia map, with a population of mobile entities 14 superimposed thereon. For example, each of the mobile entities could be a car, truck or other vehicle that is equipped with the client application software in accordance with the invention. Each mobile entity is further equipped with suitable internet-capable communication equipment to allow the mobile entity to establish communication with other mobile entities by joining one or more multicast sessions. The mobile entity population distribution can be any distribution ranging from a uniform distribution, to a normal distribution, to a highly bunched or clustered distribution. Moreover, the distribution can be expected to vary throughout the day as mobile entities move about the area in going about their business. For illustration purposes a uniform distribution has been illustrated in FIG. 1. More likely, however, a bunched or clustered distribution would be the expected condition, as different parts of the district will undoubtedly have more traffic than others.

Two mobile entities 14 and 16 have been illustrated in greater detail in FIG. 1. The size or scale of the entities has been exaggerated for illustration purposes. Entity 14 occupies a location that is north and west of entity 16. Each entity has a vision domain, represented by circles 18 and 20, respectively, that correspond to the geographic area that the entity is interested in acquiring information about. Note that the vision domains 18 and 20 of these two illustrated mobile entities happen to overlap. This implies that these two entities share a common interest. This is not a system requirement, as each entity controls its own vision domain and can therefore include or exclude as much territory as desired.

Collectively all of the communicating entities compile a body of global information 22 that is made up of all of the collective bodies of local information, such as local information 24 associated with entity 16. In the presently preferred embodiment the global information 22 is maintained in a distributed fashion. Thus it is not necessary to upload and store an entire copy of the global information in a central database. Rather, the global information exists in a distributed state, in the form of a collection of local information bodies. Each mobile entity can access the information that is relevant to that mobile entity, according to its specific vision domain. Because the local entities control their respective vision domains, any mobile entity can, if desired, acquire information about any region within the geographic area. In a traffic application, typically the mobile entity will be interested in traffic conditions nearby.

Mobile entities communicate with other mobile entities to obtain information, typically based on geographic considerations. Entities communicate with other entities that are physically present within a geographic region of interest, or that have acquired information about a geographic region of interest. The mobile entities determine which other entities they wish to communicate with using a common data structure that reflects how the mobile entities are geographically grouped or arranged. To give all mobile entities a common basis for organizing how they are grouped, the presently preferred embodiment uses a quad-tree data structure that is dynamically updated to reflect changing distribution patterns of the entities as they move about. In the preferred embodiment, the quad-tree data structure is generated centrally at the partition server, based on information collected and evaluated locally. Each time the quad-tree is revised, a copy of the quad-tree data structure is shared by with entities.

Each node or cell within the quad-tree data structure has an assigned multicast group address. A mobile entity wishing to obtain information about conditions associated with that cell simply joins the multicast group. The quad-tree data structure thus guides the mobile entities in determining which multicast groups to join, based on that entity's current vision domain.

Each mobile entity acts as both a data source and a data destination in the preferred embodiment. This has been illustrated diagrammatically in FIG. 1 at 26 and 28.

Figure 2:
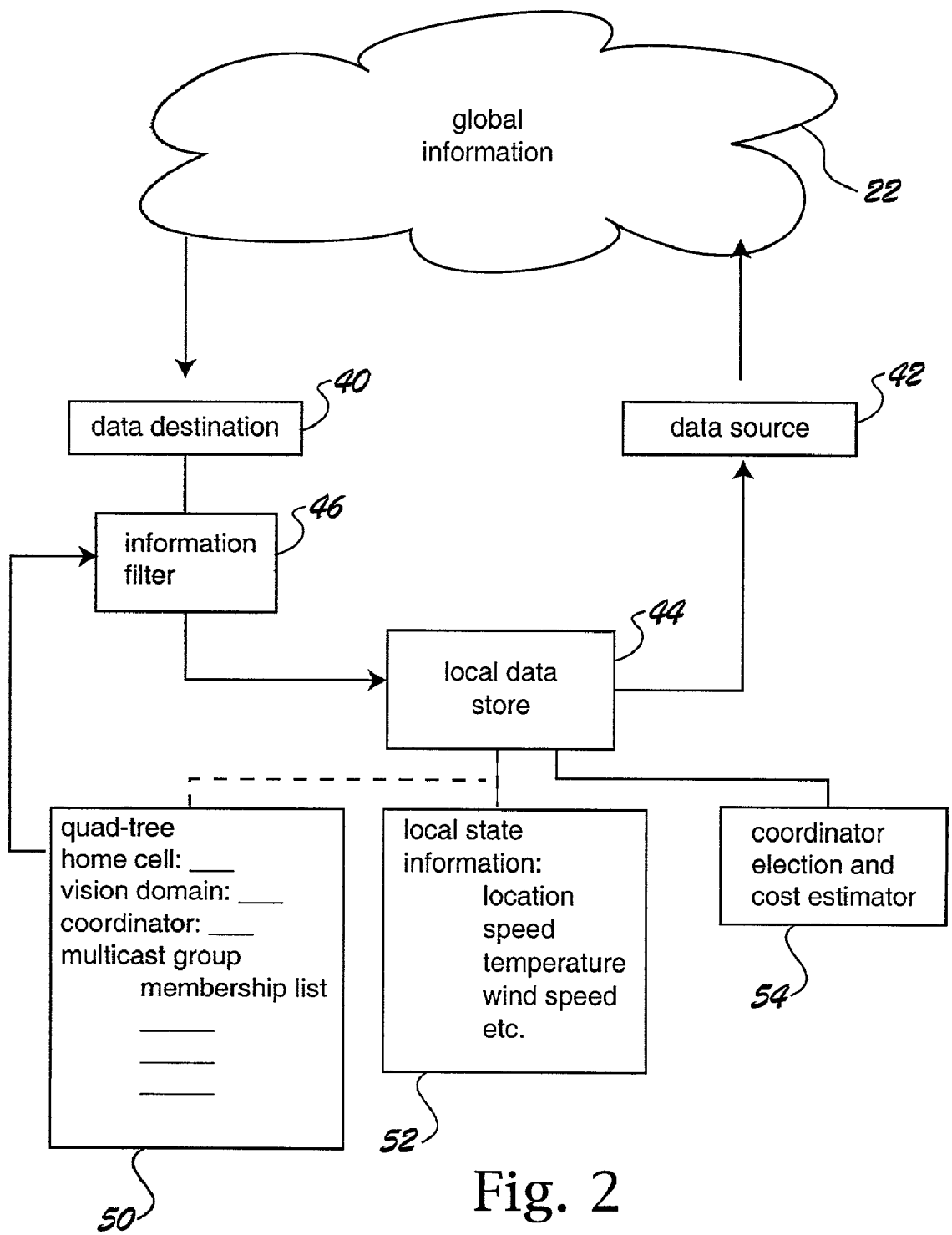
FIG. 2 is a block diagram of a client application according to a presently preferred embodiment.

In the presently preferred embodiment each mobile entity has a computer system running a client application that is functionally described in FIG. 2. The client application has a data destination port 40 through which incoming information arrives from the collective body of global information 22. Because the global information 22 is typically stored in a distributed fashion, the actual data flow will come from one or more mobile entities that the client application is in communication with using one or more multicast channels.

So that the client application can also provide information to the body of global information 22, the client application includes a data source port 42. Local information is stored in the local data store 44. As illustrated, this local data store supplies information to the data source port 42. It also receives information from the data destination port 40 after first being processed by an information filter 46. The information filter screens out superfluous information, such as information that does not pertain to the vision domain of the mobile entity.

The local data store is preferably stored in computer readable memory that is administered by the client application. The local data store preserves information about the mobile entity and its membership within a home cell of the quad-tree, as represented diagrammatically at 50. The local data store also preserves other local state information that is application specific. As shown diagrammatically at 52, the local state information may include data on the location of the mobile entity, its speed and other relevant positional data, and other conditions such as temperature, wind speed and other environmental conditions.

In the presently preferred embodiment, each mobile entity has the possibility of serving as the coordinator for the cell in which that entity is located. It is the coordinator's responsibility to assess congestion conditions within that cell, to assess whether that cell should be subdivided or merged with other cells to improve performance. In the preferred embodiment a single coordinator is elected for each cell, based on where a mobile entity is located physically within the cell. Other criteria may be used instead, if desired. The client application employs a processing module 54 that accesses information from local data store 44 regarding the current quad-tree configuration and the mobile entity's location within a particular cell to determine whether that entity meets the qualifications to be the coordinator. All other mobile entities have the same module 54 and thus are also able to determine whether they qualify as the coordinator. The coordinator election rules are designed so that one and only one coordinator is elected per cell in the presently preferred embodiment.

Because each mobile entity is potentially capable of meeting the requirements to be elected coordinator for a particular cell, the processing module 54 includes a processing routine to evaluate cost information reflecting whether the cells should be subdivided or merged. This cost information is evaluated at the cell level and is then communicated to the partitioning server, as will be more fully discussed below. The presently preferred information assesses cost based on the number of multicast group joins that have occurred within a given cell and the number of superfluous messages the members of that cell have had to filter out or reject. The join cost is incurred by a user joining the multicast groups associated within cells. The superfluous message cost is incurred by counting the number of unwanted messages received from a multicast group. Subdividing a cell into a smaller number of child cells establishes a finer grid that gives the system more capability of discerning among users and thus reduces the number of superfluous messages. On the other hand, subdividing cells into increasingly smaller child cells increases the need for users to join additional multicast groups in order to fulfill their vision domain. Thus, there is a tradeoff between the number of multicast group joins and the number of superfluous messages. This tradeoff is directly related to the density of users within a given area.

Figure 3:
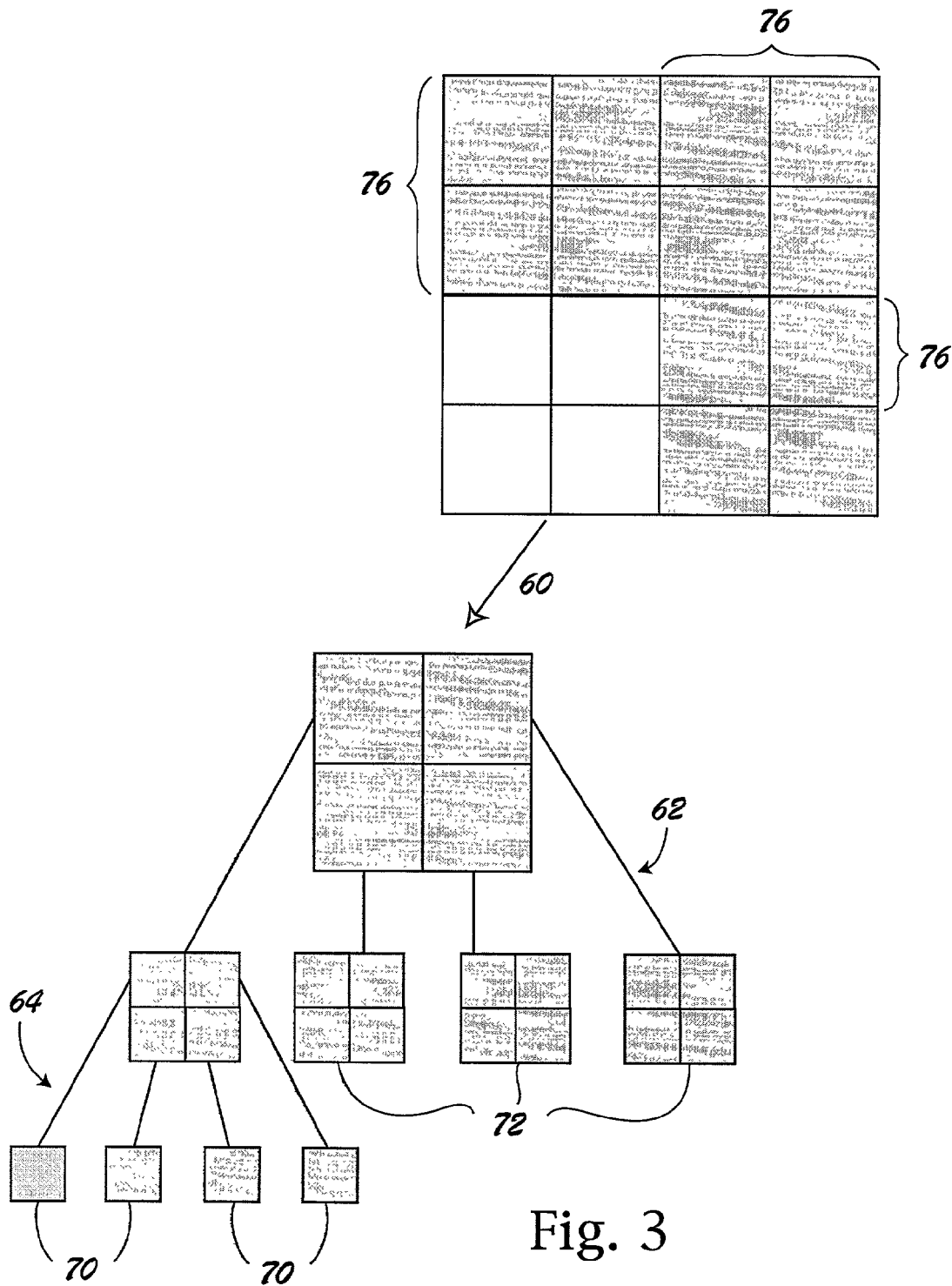
FIG. 3 is a data structure diagram illustrating one example of a quad-tree data structure.

As noted above, the presently preferred embodiment uses a quad-cell data structure to represent an area, and represent how that area is subdivided into regions or cells. As illustrated in FIG. 3, the basic principal of a quad-tree is to cover a planar region of interest by a square or other shape, and then recursively partition that square or shape into smaller squares or shapes, until each contains a suitably uniform subset of the input. In the presently preferred embodiment, each square represents a cell to which a multicast group address is assigned. Although a four-sided (square) data structure is illustrated here and presently preferred, it should be apparent that data structures of other geometries (e.g., K-d trees) and other dimensions can be used to practice the principles of the invention. Thus as used herein the term quad-tree is intended to cover n-dimensional data structures, where n is an integer value of 2 or greater.

Referring to FIG. 3, the quad-tree for the Washington D.C. area might be constructed by circumscribing a square around the entire Washington D.C. area and then recursively subdividing that square area, as illustrated at 60, 62 and 64, until cells of suitable size are achieved, based on evaluating the cost data discussed above. In the presently preferred embodiment, not all cells must be of the same size. Thus the southwest-most quadrant might be subdivided into small cells as at 70, whereas the cells slightly to the north and east might be 4 times larger as at 72, while the remaining cells might be yet larger as at 76.

Figure 4:
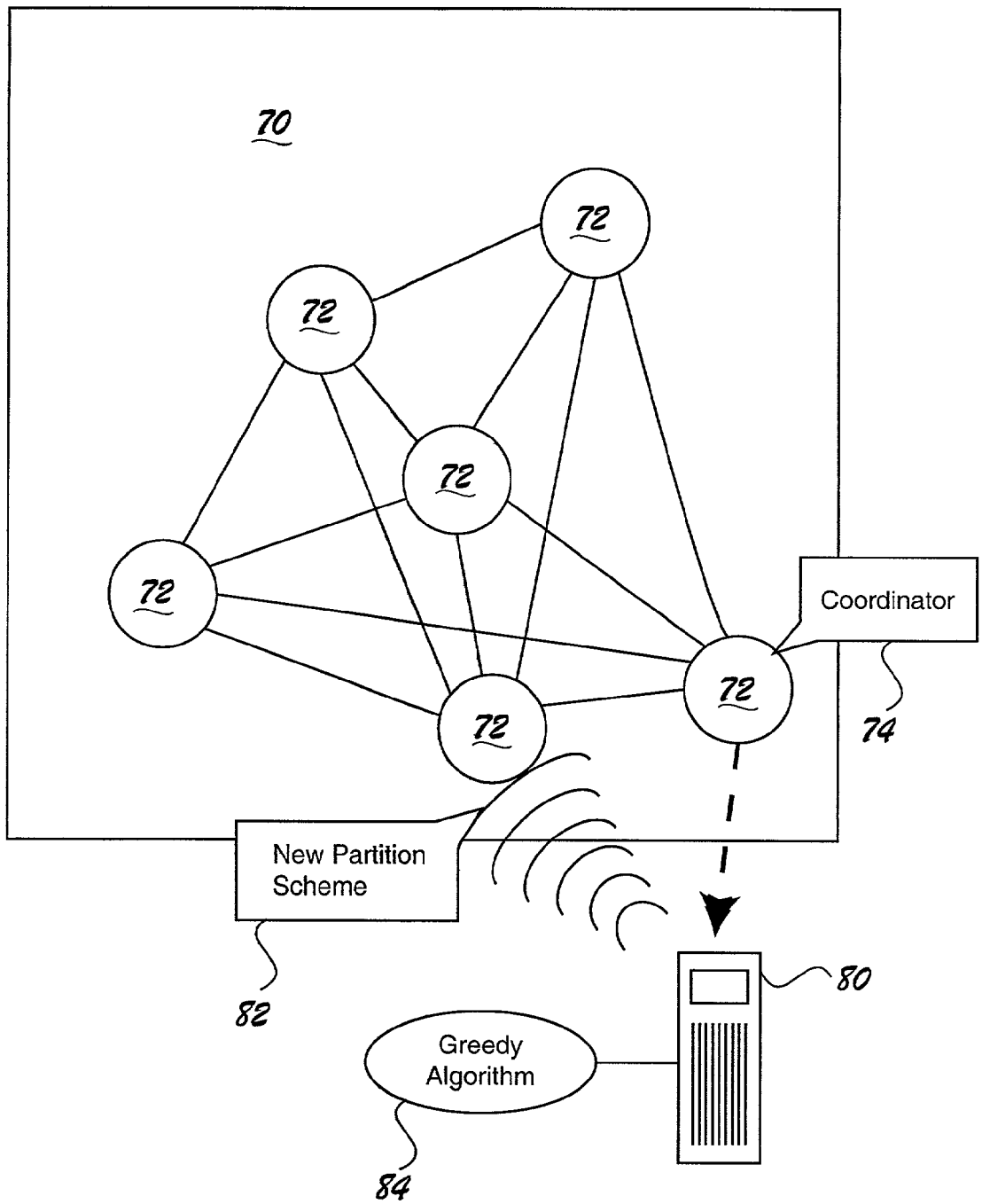
FIG. 4 is a data flow diagram illustrating the relationship among the mobile entities, the elected coordinator and the partitioning server.

According to the dynamic repartition algorithm implemented by the invention, the size and configuration of the quad-tree cells will vary dynamically as mobile entities move about. The basic partition scheme by which the quad-tree is configured at any given time is calculated by a partitioning server, using information passed to it by the elected coordinators of each cell. FIG. 4 shows how the message flow for this dynamic repartitioning takes place. In FIG. 4 a single exemplary cell 70 has been illustrated. Located within that cell are 6 mobile entities represented by circles 72. All of the mobile entities within cell 70 communicate with each other, as illustrated by the interconnecting lines, using a multicast group address that is associated with cell 70. Using election rules that will be described below in connection with FIG. 6, one of the entities is declared the coordinator. In the illustrated example in FIG. 4, the mobile entity in the lower right hand corner of cell 70 has been designated the coordinator 74. The coordinator 74 collects join and superfluous message handling data from the members of cell 70 and transmits that information to the partitioning server 80. In the presently preferred embodiment the partitioning server 80 may be a central server that is responsible for all cells within the region. Of course, if desired, a single server can be replaced with a network of servers to distribute the partition generating function.

The partitioning server uses a predefined algorithm to determine a new partition scheme, using information received from all coordinators of the various cells represented in the quad-tree. It broadcasts a new partition scheme 82 to the mobile users, either by broadcasting to all user multicast groups, or by relaying the information through a single user, such as coordinator 74. The system may have a dedicated coordinator multicast group for this purpose. The new partition scheme represents a new quad-tree that is stored by each mobile user (in local data store 44, FIG. 2). The quad-tree information is then used by each mobile entity to determine which multicast groups that entity should join based on the vision domain of that entity.

Figure 6:
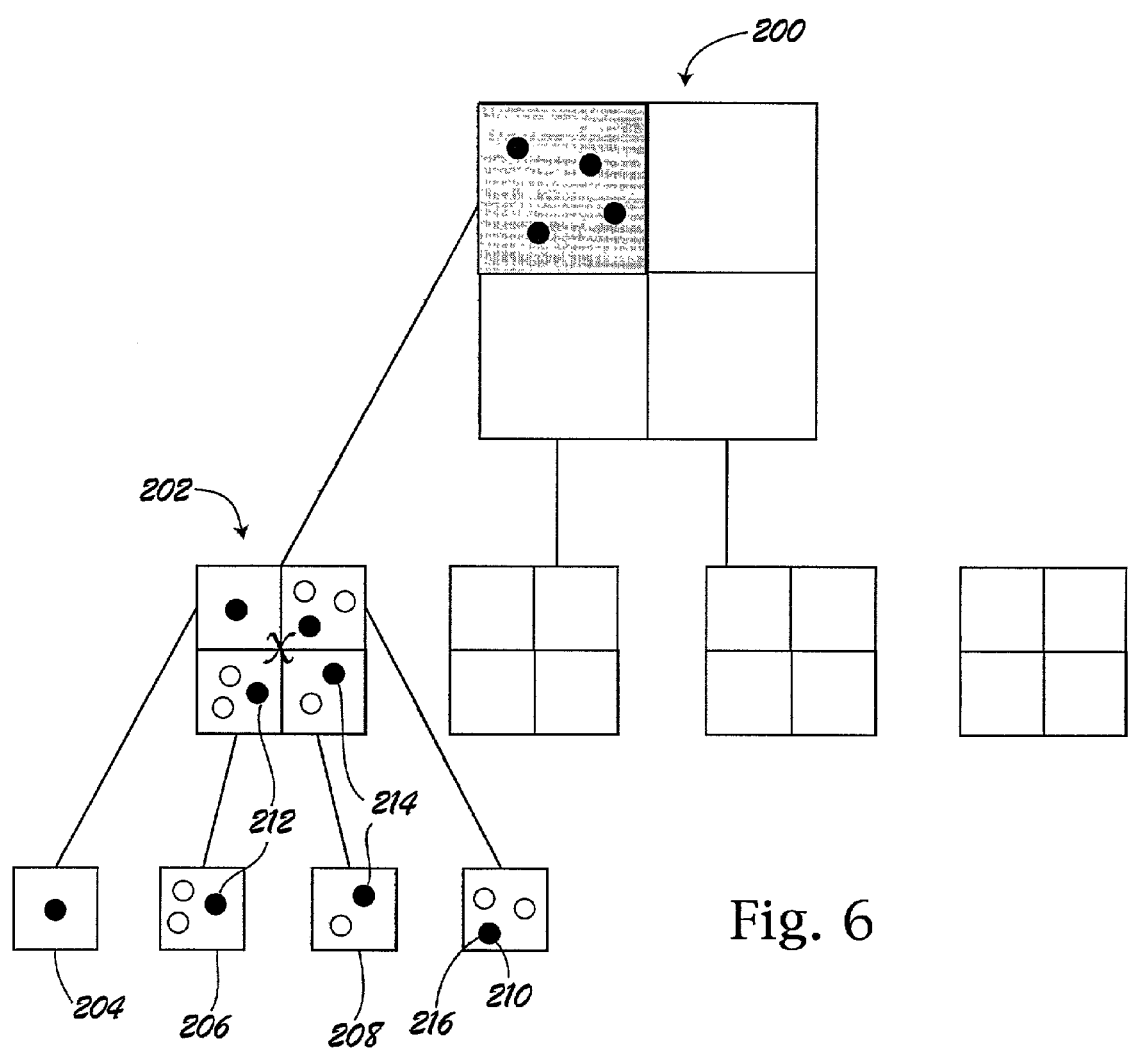
FIG. 6 is an exemplary quad-tree data structure populated with example mobile entities, useful in understanding the coordinator election process.
Figure 7:
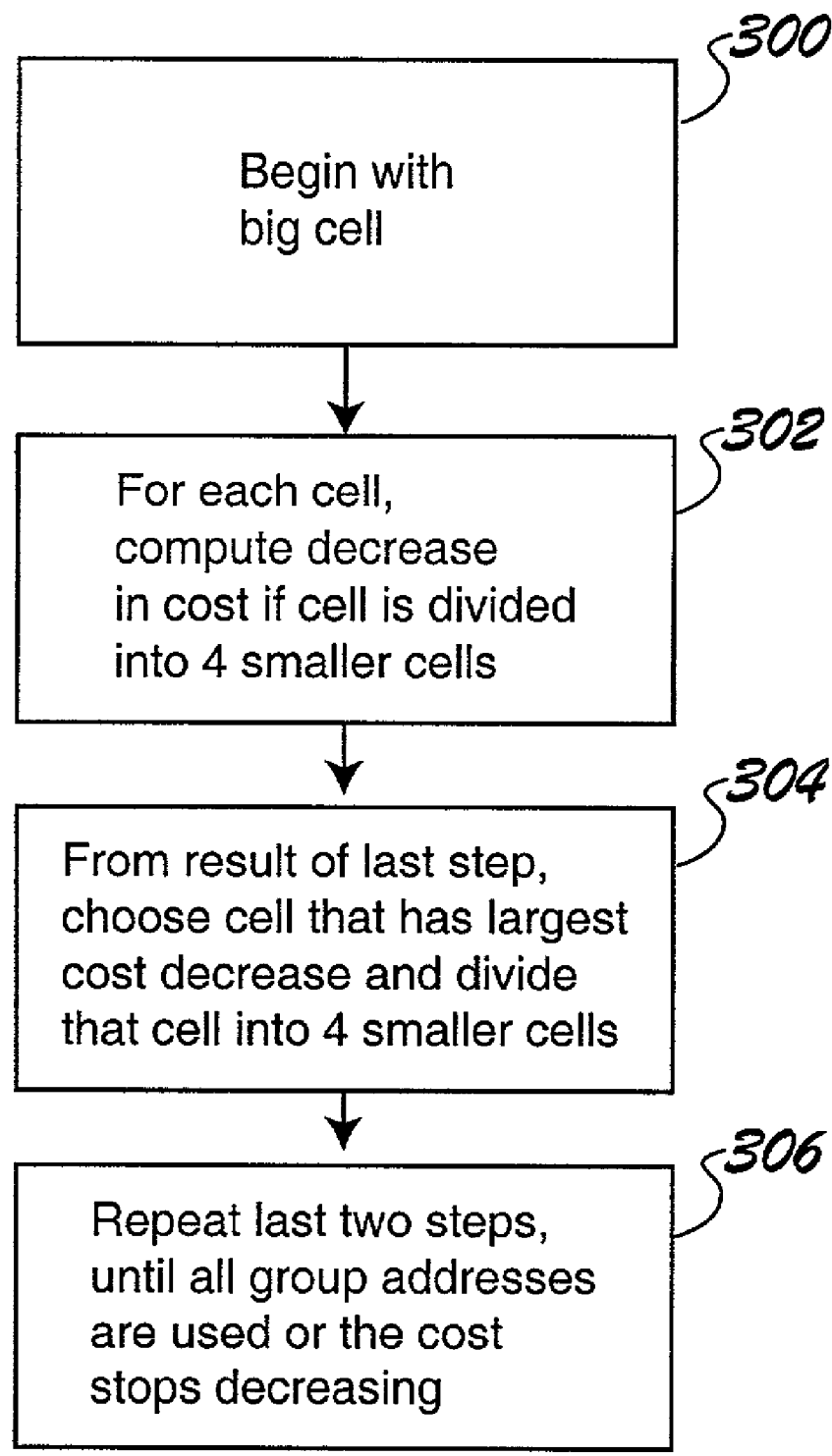
FIG. 7 is a presently preferred top down greedy algorithm for subdividing cells.

The presently preferred partitioning server uses a greedy algorithm 84 to generate the new partition scheme by modifying the existing quad-tree data structure based on locally estimated cost data. To generate the initial quad-tree data structure a top-down greedy algorithm is presently preferred. A flow chart of this greedy algorithm is illustrated in FIG. 7 and will be discussed below. Before describing the initialization algorithm, however, the basic dynamic repartitioning process illustrated in FIG. 4 will be more fully described with reference to the flow chart of FIG. 5 and the quad-tree diagram of FIG. 6.

Figure 5:
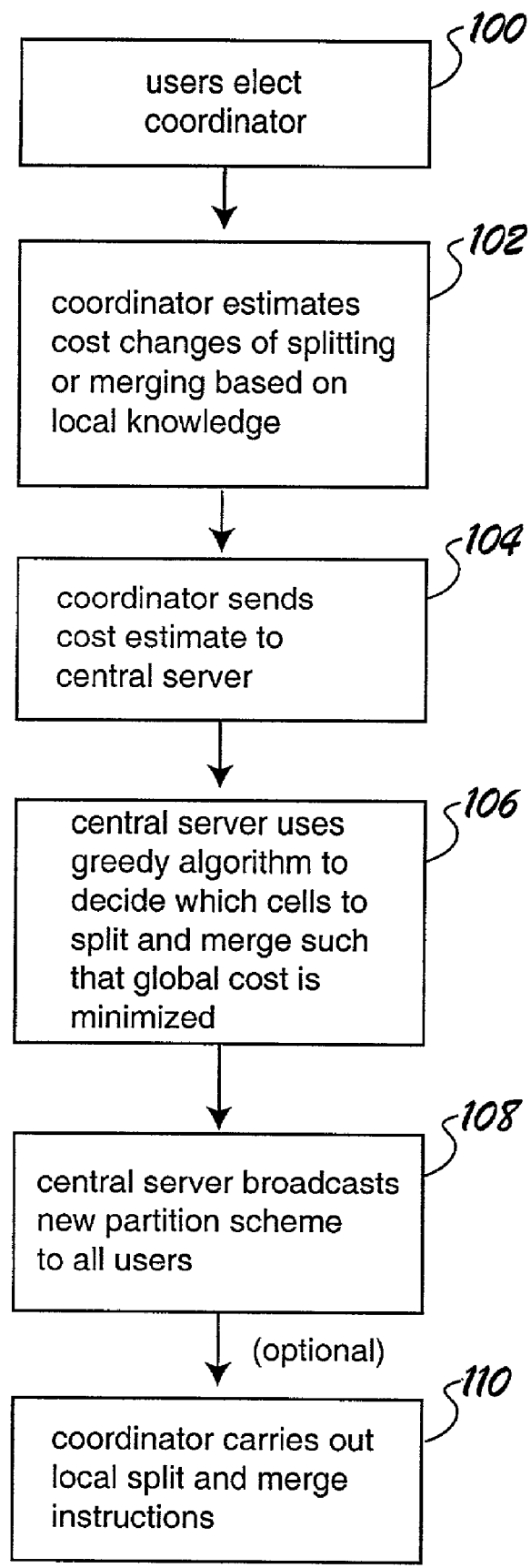
FIG. 5 is a flow chart of the dynamic partitioning algorithm.

Referring to FIG. 5, the dynamic partitioning algorithm begins at step 100 with election of a coordinator. In the presently preferred embodiment the coordinator is elected based on its geographic proximity to the center of the parent cell from which its cell was derived. This is illustrated in FIG. 6. In FIG. 6, a plurality of mobile entities have been illustrated as circles. The entities that meet the coordinator criteria have been colored in black.

To understand the coordinator election process, first refer to the large cell 200. One of its child cells 202 is shown subdivided into grandchild cells 204, 206, 208 and 210. Each of the grandchild cells 204–210 will elect one coordinator. The winning candidate is the one that is closest to the center of that child's parent cell. In this case, the center of parent cell 204 has been marked with an X. Because grandchild cell 204 contains only one entity, that entity is, by default, closest to the center X of the parent cell. Mobile entity 212 of grandchild cell 206 is closer to the center X than any other entity in that cell. Thus entity 212 is elected as coordinator for cell 206. Similarly, entities 214 and 216 win the closest to the center contest in their respective cells and are thus elected as coordinators.

While the closest to center technique serves to determine one coordinator for each cell, other techniques for electing the coordinator may be employed in the alternative. Because the system is designed to expect mobile entities to move about, the election of coordinator process is repeated at a sufficient frequency to capture the dynamic nature of the distributed information system.

Referring back to FIG. 5, once the coordinator election process has completed, each coordinator estimates, in step 102, the cost changes of splitting or merging its cell based on local knowledge. The coordinator then sends the cost estimate information to the server at step 104. The server at step 106, uses a greedy algorithm to decide which cells to split and which to merge, such that the global cost is minimized. In step 108, the server broadcasts the newly computed partition scheme back to all users. This can be done by a blanket broadcast to all user multicast groups. Optionally, as illustrated at step 110, the new partition can be sent to the coordinator, perhaps via a coordinator muticast group, for each cell and that coordinator carries out the responsibility of disseminating the local split and merge instructions to each member of the coordinator's cell.

As noted above, the presently preferred embodiment uses a top-down greedy algorithm to generate the initial partition scheme for the quad-tree. The greedy algorithm is illustrated in FIG. 7 beginning at step 300. At step 300, the big cell circumscribed around the entire area is analyzed first. The algorithm proceeds recursively. For each cell, the algorithm computes the decreasing cost if that cell is divided into n smaller cells. This is illustrated at step 302. Next, from the result of step 302, the algorithm chooses the cell that has the largest cost decrease. It then divides that cell into n=4 smaller cells, as depicted at 304. Steps 302 and 304 are then repeated until all cells have been processed or until the cost stops decreasing, as illustrated at step 306. While the top-down greedy algorithm is presently preferred, other algorithms are also possible. For example, the new partition scheme could be calculated using a top-down greedy algorithm based on the number of users, or upon a bottom-up greedy algorithm. An example of a top-down greedy algorithm based on the number of users has the following steps:

1. Begin with the square circumscribing area as the big cell. For each cell within the big cell, compute the number of users in that cell.
2. From the result of the preceding step, choose the cell that has the largest number of users and divide it into four smaller square cells.
3. Repeat the preceding two steps until all the group addresses (cells) are used or the number of users in every cell is less than a threshold.
4. If there still are any available groups, continue dividing using a greedy algorithm, such as the algorithm depicted in FIG. 7.

An example of a bottom-up greedy algorithm has the following steps:
1. Divide the area into cells according to a complete quad-tree of a given depth.
2. For each mergible node (that is each node that has four leaf children) compute the cost increase.
3. Choose the node with the least merged cost increase and merge it.
4. Repeat the preceding two steps until the number of cells is equal to the number of available multicast groups.

In use, the mobile entities use their respective vision domains and the current quad-tree to effect a state disseminating protocol. The protocol is designed to ensure that the state message originating from each mobile entity reaches all other interested entities. The protocol includes the following steps:

1. Each user computes the cells which intersect with its own "vision domain" using its knowledge of the current partition scheme reflected in the quad-tree data structure.
2. Each user joins all multicast groups associated with these intersecting cells, and prepares to receive information from these multicast groups.
3. Each user sends its state information to its own "home" cell group, (that is, the cell group within which it is located).
4. Upon receiving the information from all joined multicast groups, the user filters out superfluous messages and maintains a record of the number of messages filtered so that information can be used as a cost metric by the coordinator.

Dynamic repartitioning is effected in the presently preferred embodiment by starting with the static partitioning generated using the greedy algorithm of FIG. 7 (or an equivalent). As mobile entities move about, they may dynamically join or depart from multicast group sessions. New coordinators are also elected based on the new partition scheme. The presently preferred dynamic partitioning algorithm proceeds according to the following steps:

1. Users move around. With every step, new coordinators are elected.
2. The coordinators compute the cost decrease associated with splitting each of its child leaves.
3. If a node has four child nodes, the corresponding coordinator computes the cost increase associated with merging those four nodes.
4. The coordinators each send cost change information to the partitioning server. The server decides if the new partition should be created. Possible criteria include creating a new partition periodically after a certain time has passed, or if the cost decrease of the new partition reaches a certain level.
5. If the server decides to create a new partition, it uses a greedy algorithm to compute the cells that should be split and merged to create the new partition scheme. The new scheme is broadcast to all users.

While the above algorithm does rely on a partitioning server to decide the new partition scheme, the server carries very little computational burden because the cost estimation is performed distributively by the coordinators.

The dynamic partitioning algorithm of the invention was tested using computer simulation with real geographical data and was found to reduce message costs by as much as 80 percent. In the simulation, the performance of the dynamic quad-tree partition algorithm was tested and compared with cell-based protocols and static quad-tree partitions. The square simpulation area is assumed to have unit side lengths. In the simulation, it was assumed that all users had the same circular vision domain. The radius of that vision domain was set at 0.01. All users randomly chose a direction and moved a constant step toward that direction. If the movement would take the user out of the area, the user was "bounced back" into the area such that the number of users remained constant. In the simulation, we assumed that all users would have the same step size. The step sizes chosen were 0.001, 0.002, 0.005 and 0.01, respectively. To reduce the amount of data, we sampled one data point every 100 steps. A new partition was created when the new partition would decrease the message cost by 20 percent. The results demonstrated that the dynamic quad-tree partition algorithm would save as much as 80 percent of the message cost.

While the invention has been described in its presently preferred implementation, it should be understood that the invention is capable of modification and is applicable to a variety of different uses, all within the spirit of the invention as set forth in the appended claims.

What is claimed is:

1. A method for grouping mobile entities, comprising:
defining a partitioning entity;
constructing an initial data structure that defines a plurality of cells occupied by said mobile entities;
for each cell, electing a coordinator from a set of mobile entities occupying that cell;
said coordinators cooperatively computing costs associated with selectively subdividing and merging said cells and communicating said costs to said partitioning entity; and
said partitioning entity using said costs to generate a new partition scheme and communicating said new partition scheme to said mobile entities;
wherein said mobile entities use their respective vision domains and a most current partitioning scheme to effect a state disseminating protocol designed to ensure that state messages originating from each mobile entity reach all other interested mobile entities, each vision domain corresponding to a predefined area of interest.

2. The method of claim 1 further comprising:
associating a multicast group with each of said cells and using said multicast group to support communication among mobile entities within each cell.

3. The method of claim 1 wherein said step of cooperatively computing comprises:
each coordinator computing a first cost associated with subdividing that coordinator's cell; and
using said data structure to identify sibling relationships among said coordinators to define sibling coordinators; and
said sibling coordinators collectively computing a second cost associated with merging cells occupied by said sibling coordinators.

4. The method of claim 1 further comprising:
associating a multicast group with each of said cells;
associating a vision domain with each of said entities; and
enabling said entities to selectively join at least one of said multicast groups based on said vision domain.

5. The method of claim 1 further comprising associating a multicast group with each of said cells, allowing said entities to join at least one of said multicast groups and computing said costs by assessing the number of multicast groups said entities have joined.

6. The method of claim 1 further comprising associating a multicast group with each of said cells and using said multicast groups to communicate said new partition scheme to said mobile entities.

7. The method of claim 1 further wherein said partitioning entity generates said new partition scheme by dividing the one of said cells that gives the largest cost decrease.

8. A system for grouping mobile entities comprising:
a partitioning server;
said partitioning server defining a data structure having nodes corresponding to cells occupied by said mobile entities;
a plurality of client applications each associated with one of said mobile entities;
said client applications each having communication mechanism capable of communicating with the communication mechanism of other client applications and with said partitioning server; and
said client applications and said partitioning server being configured to establish a dynamic partition protocol whereby said data structure is reconfigured based on the number of communicating entities within each of said cells;
wherein said mobile entities use their respective vision domains and a most current partitioning scheme to effect a state disseminating protocol designed to ensure that state messages originating from each mobile entity reach all other interested mobile entities, each vision domain corresponding to a predefined area of interest.

9. The system of claim 8 wherein said client applications each have memory for storing the vision domain corresponding to the predefined area of interest and said communication mechanism of each of said client applications is configured to join in multicast group communication mobile entities in cells that overlap with said vision domain.

10. The system according to claim 8 wherein said mobile entities are vehicles having position location equipment that generates vehicle position data and wherein said client applications communicate said vehicle position data to other client applications associated with mobile entities occupying a common cell.

11. The method of claim 2 wherein said state disseminating protocol includes:
computing by each user of cells which intersect with its own vision domain using its knowledge of the current partition scheme;
joining by each user of all multicasting groups associated with its intersecting cells, and preparing to receive information from these groups;
sending by each user of its state information to its own cell group in which it is located; and
upon receiving the information from all joined multicast groups, filtering out by each user of superfluous messages and maintaining by each user of a record of a number of messages filtered to serve as a cost metric used by one or more coordinators.

12. The system of claim 8 wherein said state disseminating protocol includes:
computing by each user of cells which intersect with its own vision domain using its knowledge of the current partition scheme;
joining by each user of all multicasting groups associated with its intersecting cells, and preparing to receive information from these groups;
sending by each user of its state information to its own cell group in which it is located; and
upon receiving the information from all joined multicast groups, filtering out by each user of superfluous messages and maintaining by each user of a record of a number of messages filtered to serve as a cost metric used by one or more coordinators.

* * * * *